United States Patent [19]

Bähre et al.

[11] 4,134,528

[45] Jan. 16, 1979

[54] METHOD OF PRODUCING COPPER CLAD STEEL WIRE

[75] Inventors: Werner Bähre, Burgdorf; Karl H. Stobäus, Hanover; Gerhard Ziemek, Langenhagen, all of Germany

[73] Assignee: Kabel-und Metallwerke Gutehoffnungshuette, Germany

[21] Appl. No.: 859,802

[22] Filed: Dec. 12, 1977

[30] Foreign Application Priority Data

Jun. 16, 1977 [DE] Fed. Rep. of Germany ....... 2727186

[51] Int. Cl.$^2$ ...................... B23K 28/02; B21D 39/04
[52] U.S. Cl. .................................. 228/115; 228/130; 228/231
[58] Field of Search ............... 228/115, 117, 130, 148, 228/231, 243

[56] References Cited

U.S. PATENT DOCUMENTS

| Re. 28,526 | 8/1975 | Ziemek ................................. 228/130 |
| 2,063,470 | 12/1936 | Staples ................................. 228/130 |
| 3,463,620 | 8/1969 | Winter ................................. 228/243 |
| 3,894,675 | 7/1975 | Klebl et al. .......................... 228/130 |

Primary Examiner—Al Lawrence Smith
Assistant Examiner—K. J. Ramsey
Attorney, Agent, or Firm—Marn & Jangarathis

[57] ABSTRACT

Copper-clad steel wire is produced by forming a copper tube around the wire, and drawing down the copper tube and wire to reduce the cross-section of the wire by at least 30%. The wire is annealed, slowly cooled and the cross-section further reduced by at least 10%.

5 Claims, No Drawings

METHOD OF PRODUCING COPPER CLAD STEEL WIRE

The invention relates to a method of producing copper-clad steel wire, in which a copper strip fed longitudinally is formed around a continuously fed steel wire into a tube having a larger inside diameter than the outside diameter of the steel wire and is welded at its edges, and the sheath thus formed is drawn down onto the steel wire.

A method of this kind is known from U.S. Pat. No. 3,894,675. The copper sheath surrounding the steel wire in this method is drawn down to the outside diameter of the steel wire to make a close fit, and is then heated to 850° C. in the continuous resistance annealing plant. At this temperature the wire is reduced in cross-section by at least 10%. With this known method difficulties occurred in obtaining a connection between the copper and the steel.

The present invention is directed to that of providing a method by which it is possible to provide steel wire with a firmly adhering copper cladding in a particularly economical manner.

In accordance with the invention, the wire is reduced in cross-section by at least 30% by cold forming, i.e., at or near room temperature, thereupon annealed for at least three hours at at least 800° C., cooled slowly, and finally reduced in cross-section by at least 10%. The cold forming of the wire with a reduction of at least 30% is intended to ensure firstly that the surface of contact between copper and steel will be enlarged, and secondly that any coatings of oxides or impurities existing on the surface of contact will be torn up by this drawing process, thereby improving the metallurgical bonding of the two metals. The annealing at a temperature of at least 800° C. is expediently effected by a batch annealing process. The slow cooling prevents the appearance in the steel wire of a martensitic structure, which would make a further reduction of cross-section difficult.

In general, the cooling is effected to a temperature at or near room temperature, with the cooling time period generally being at least 4 hours. During the annealing process the different materials diffuse into one another and at the same time are firmly metallurgically bonded to one another. The following reduction of cross-section by at least 10% in the cold state; i.e., at or near room temperature, is intended to improve this bond still further and at the same time to reduce the thickness of the diffusion layer. At the same time the surface of the clad wire, which was impaired by the annealing process, is thereby smoothed.

An optimisation of the process described above consists in that the wire is first reduced in cross-section by at least 50% in a plurality of drawing stages, thereupon annealed at from 830° C. to 870° C. for from three to four hours in vacuo or in an atmosphere of protective gas and slowly cooled in vacuo or in an atmosphere of protective gas, and finally reduced in cross-section by at least 30% in the cold state in a plurality of passes. Annealing in vacuo or in an atmosphere of protective gas reliably prevents oxidation of the copper cladding and also the sticking of the wires, which are expediently wound into coils or on reels. In order to eliminate aging which may occur during the last passes, it is advantageous for the wire to be relieved of stress by annealing after a number of passes. This stress-free annealing is advantageously effected at a temperature of at least 600° C.

The invention will be explained more fully with the aid of an example of an embodiment thereof.

A steel wire which is in the form of a coil, and which has previously been drawn, soft annealed, pickled and neutralised, is first straightened in a continuous plant and cleaned by means of a number of sets of brushes. A thin copper strip running continuously off a magazine reel is continuously formed by means of a forming tool into a slit tube round the continuously fed steel wire, the inside diameter of the tube being slightly larger than the outside diameter of the steel wire in order to avoid faults in the subsequent welding operation, in which the longitudinal edges of the copper strip are joined together by TIG welding. After the welding, the copper cladding is drawn down into firm contact with the steel wire by means of a drawing die, although it is not yet bonded to the steel core. The ratio between the diameter of the steel wire and the copper cladding determines the conductance of the clad wire.

This wire is preferably drawn down still further in a plurality of separate individual passes to provide a reduction in cross-section of at least 30%, and wound on special annealing reels or into loose coils. The special annealing reels or the coils are introduced into a furnace and annealed at 850° C. in vacuo for 4 hours. The coils are then slowly cooled in the furnace.

For this purpose it has been found expedient for the temperature to be kept constant for a few minutes at between about 350° C. and 500° C. in order to produce a sorbitic structure in the steel wire. This sorbitic structure permits particularly easy forming.

After the annealing process, the wire is drawn down to the final size (at least 10% reduction) in single or multiple drawing machines, depending on the grade of steel used. If reductions of cross-sections of more than 50% are necessary, the wires are additionally annealed at about 620° C. after a number of passes.

Numerous modifications and variations of the present invention are possible in light of the above teachings and, therefore, within the scope of the appended claims the invention may be practised otherwise than as particularly described.

What is claimed is:

1. A method of producing copper-clad steel wire, comprising:
    providing a copper tube around a steel wire, said tube having an inside diameter larger than the outside diameter of the steel wire;
    reducing the cross section in the cold state by at least 30% followed by annealing at at least 800° C. for at least 3 hours, slow cooling and reduction in cross-section in the cold state by at least 10%.

2. A method according to claim 1, wherein the wire is first reduced in cross-section by at least 50% in a plurality of drawing stages, thereupon annealed at from 830° C. to 870° C. for from 3 to 4 hours in vacuo or in an atmosphere of protective gas, slowly cooled in vacuo or in an atmosphere of protective gas and finally reduced in cross-section by at least 30% in the cold state in a plurality of passes.

3. A method according to claim 2, wherein the wire is relieved of stress by annealing between the last passes.

4. A method according to claim 1 wherein the cooling is effected over a period of at least four hours.

5. A method according to claim 4 wherein the reduction is cross-section prior to annealing is by at least 50% and the reduction in cross-section subsequent to annealing is by at least 30%.